United States Patent [19]
Salopek

[11] Patent Number: 5,829,655
[45] Date of Patent: Nov. 3, 1998

[54] ASSEMBLY-IN-PLACE STORAGE CONTAINER FOR USE BEHIND THE FRONT SEATS OF AN EXTENDED CAB TRUCK

[76] Inventor: James F. Salopek, #21 San Sebastian Rd., Santa Fe, N. Mex. 87505

[21] Appl. No.: 872,797
[22] Filed: Jun. 10, 1997
[51] Int. Cl.$^6$ ....................................................... B60R 5/04
[52] U.S. Cl. .................................. 224/402; 217/15; 220/6; 224/42.34; 224/275; 224/542
[58] Field of Search ....................................... 224/275, 402, 224/42.33, 42.34, 539, 542, 543, 925; 217/12 R, 15; 220/6

[56] References Cited

U.S. PATENT DOCUMENTS

| 1,524,966 | 2/1925 | Boelman et al. | 217/15 |
| 3,613,931 | 10/1971 | Schifferle | 217/15 X |
| 4,815,593 | 3/1989 | Brown | 206/315.11 |

Primary Examiner—Renee S. Luebke
Attorney, Agent, or Firm—Daniel Robbins

[57] ABSTRACT

An assemble-in-place storage container mounts in the space behind the front seats of an extended cab truck. The container contains bottom, side, front, back and top panels which are configured to form the body of the container, as well as divider panels to provide compartments within the container. The container mounts on the horizontally oriented metallic back supports of the folded down jump seats of an extended cab truck. The bottom panel is sized and shaped to fit over the "footprint" of the folded down jump seats, and side panels are hinged to the bottom panel and are collapsed onto the bottom panel. With the bottom panel in place, the side panels are extended to the vertical; the side panels having sloping front edges conforming to the taper of the back of the truck's seats. The back and front panels are then vertically put into place, and are locked into position by tabs which fit into slots in the side panels. Divider panels having tabs which lock to slots in the front and back panels may then be inserted into the container to provide internal compartments. No tools or hardware are required in assembly of the container of the invention, and the entire assembly operations are performed without removal of the front seats from the cab. The container efficiently fills the space available in the cab extension, and because it substantially fills the space it is impossible to install or remove the assembled container without disassembly.

14 Claims, 6 Drawing Sheets

ASSEMBLY-IN-PLACE STORAGE CONTAINER FOR USE BEHIND THE FRONT SEATS OF AN EXTENDED CAB TRUCK

BACKGROUND OF THE INVENTION

1. Field of the Invention

This invention relates to a storage container, and in particular to a storage container for use in a truck having an extended cab.

2. Description Relative to the Prior Art

Since the advent of the automobile, a variety of storage containers for incorporation either into an automobile or truck have been disclosed. Among the earliest, U.S. Pat. No. 1,179,445 was directed towards a storage container temporarily placed on the frame of an automobile's front seat in such a way as to block access to the steering wheel. This was intended not only to provide storage, but also to prevent theft of the car. Later issued patents, such as U.S. Pat. No. 4,750,773 recognized a primary use of a truck as a working vehicle calling for the transportation of tools, and disclosed a tool container which mounted in the bed of the truck. The fact that the container was readily visible and accessible in the truck bed was an invitation to pilferage, however the use of a container lock provided some degree of security. More secure was a container totally accommodated within the cab of the truck, where the locking of the cab doors provided an added element of immunity from burglary of the container and its contents. As trucks became more extensively used as recreational vehicles as well as a work vehicles, containers were disclosed for storage of fishing gear, hunting rifles and other sporting equipment, as well as for work related tools and materials. These containers of the prior art were pre-assembled boxlike devices, and could be placed in the cab behind the driver's and passenger's seats. Such containers were fully pre-assembled portable units and were configured to be lifted in and out of the cab, usually by means of a handle attached to the top of the container. These pre-assembled containers make inefficient use of the space behind the seats, as it is necessary to provide clearances allowing the container to be maneuvered in and out of the cab. Examples are disclosed in U. S. Pat. No. 4,832,193 issued in the name of Kime, and U.S. Pat. No. 4,815,593 issued in the name of Brown.

SUMMARY OF THE INVENTION

Rather than provide a pre-assembled container, the present invention discloses an assemble-in-place storage container for mounting in the space behind the driver and passenger seats of an extended cab truck. The container, in disassembled form, contains bottom, side, front, back and top panels which are configured to form the body of the container, as well as divider panels to provide compartments within the container. The container is designed for assembly and mounting on the horizontally oriented metallic back supports of the folded down jump seats of, for example, the Ford extended cab truck, 1978–1994 . The bottom panel is sized and shaped to fit over the "footprint" of the folded down jump seats, and the container efficiently fills space encompassed by the backs of the truck seats and the shell of the extended cab; in assembled form it is not possible to remove the container from the truck. In assembling the container in place, side panels are provided which are hinged to the bottom panel and are collapsed onto the bottom panel. With the bottom panel in place, the side panels are extended to the vertical; the side panels having sloping front edges to conform to the taper of the back of the truck's seats. With the side panels extended, the back and front panels are vertically put into place, and are locked into position by tabs which fit into slots in the side panels. Divider panels having tabs which lock to slots in the front and back panels may then be inserted into the container to provide internal compartments. It will be noted that no tools or hardware are required in assembly of the container of the invention, and the entire assembly operations are performed without removal of the front seats from the cab.

BRIEF DESCRIPTION OF THE DRAWINGS

The invention will be described with respect to the figures, of which.

DESCRIPTION OF THE PREFERRED EMBODIMENTS

Figure 1:
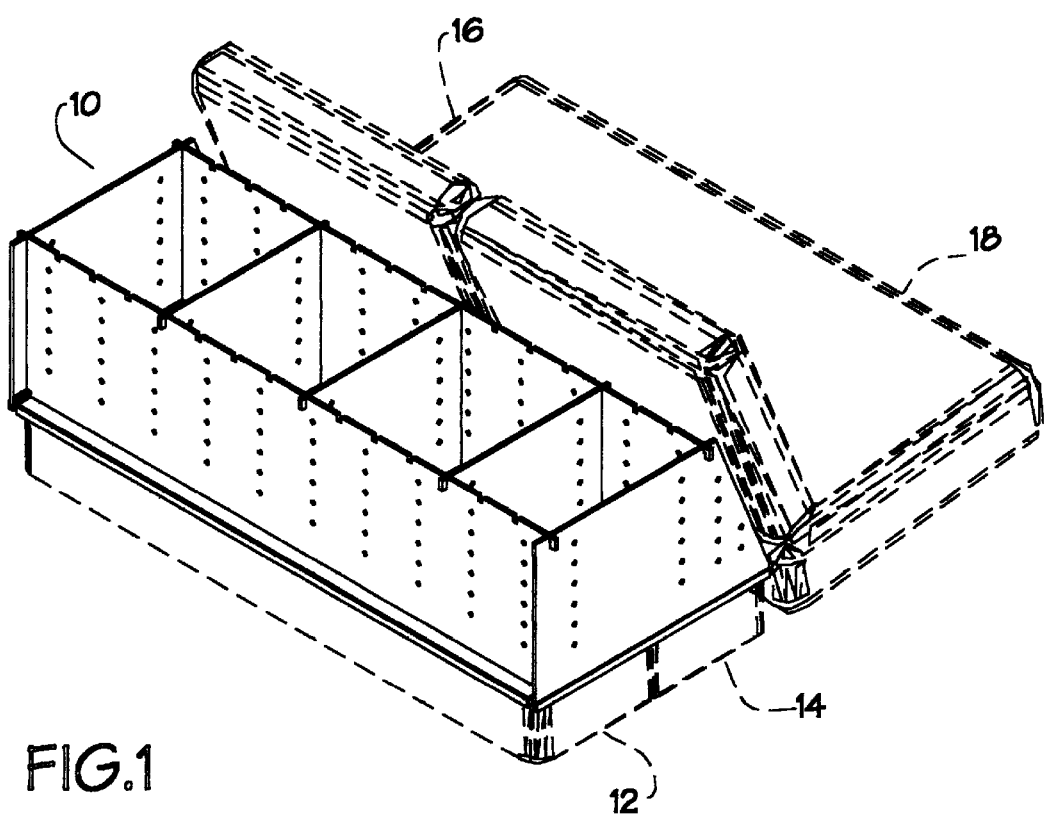
Fig. 1 is an isometric drawing of the container of the invention positioned behind the front seats of an extended cab truck.
Figure 2:
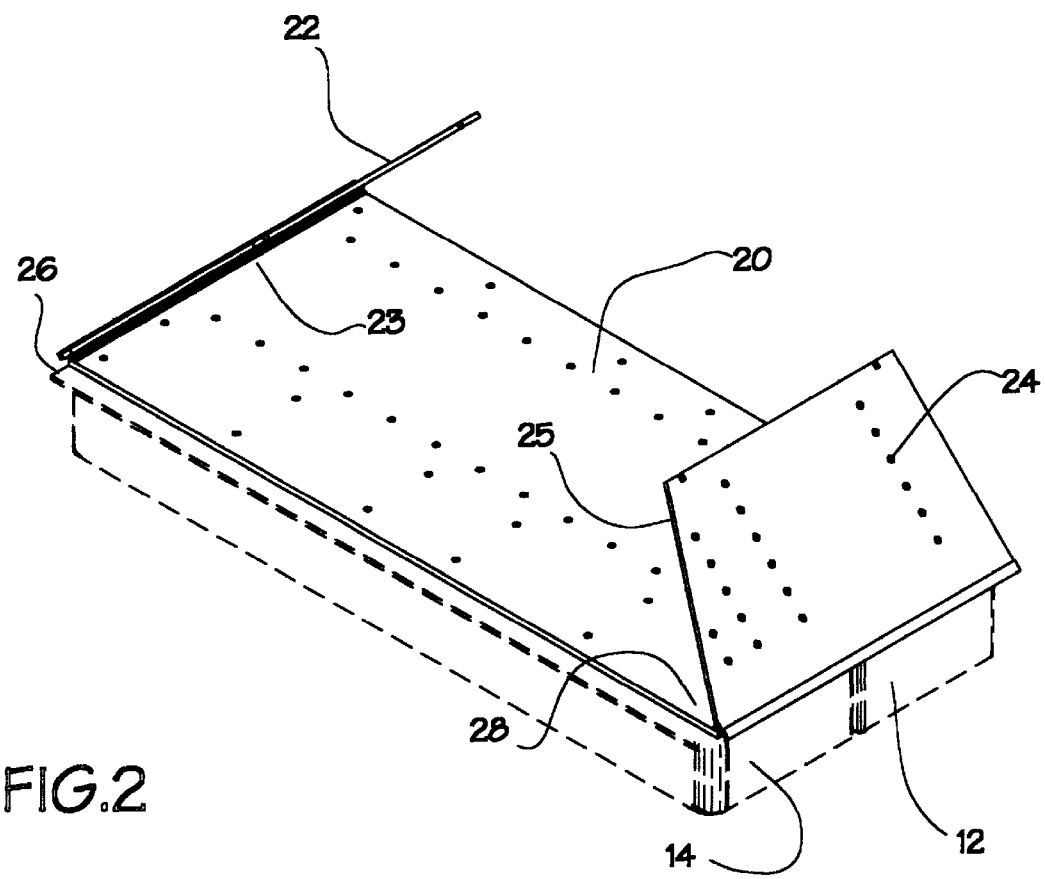
FIG. 2 is a drawing of the bottom panel and the side panels attached by hinges to it.
Figure 3:
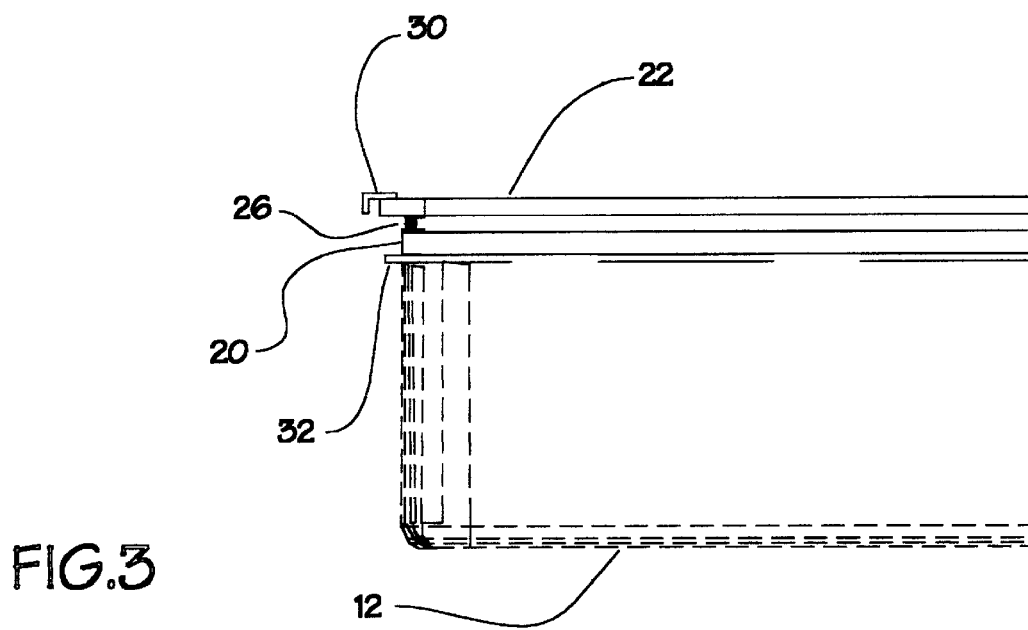
FIG. 3 is a drawing showing the securing of the bottom panel to a structural member of the cab.

Referring to FIG. 1, an assembled container 10 is shown in position on the folded jump seats 12,14 behind the truck's driver seat 16 and passenger seat 18. The initial step in assembling the container 10 is placement of its bottom panel 20 onto the folded jump seats 12,14 (FIG. 2). Side panels 22, 24, rotatably secured by hinges 26,28 to the bottom panel 20, are then raised to the vertical position. Referring to FIG. 3, an angle bracket 30 secured to side panel e.g. 22 engages the lip of a metal tab 32 on the folded down jump seat, e.g. 12, locking the bottom panel 20, and attendantly the entire container 10, to the truck's structure. In being raised to the vertical, the other side panel 24, contains a bracket that identically engages another tab on the folded down jump seat.

Figure 4:
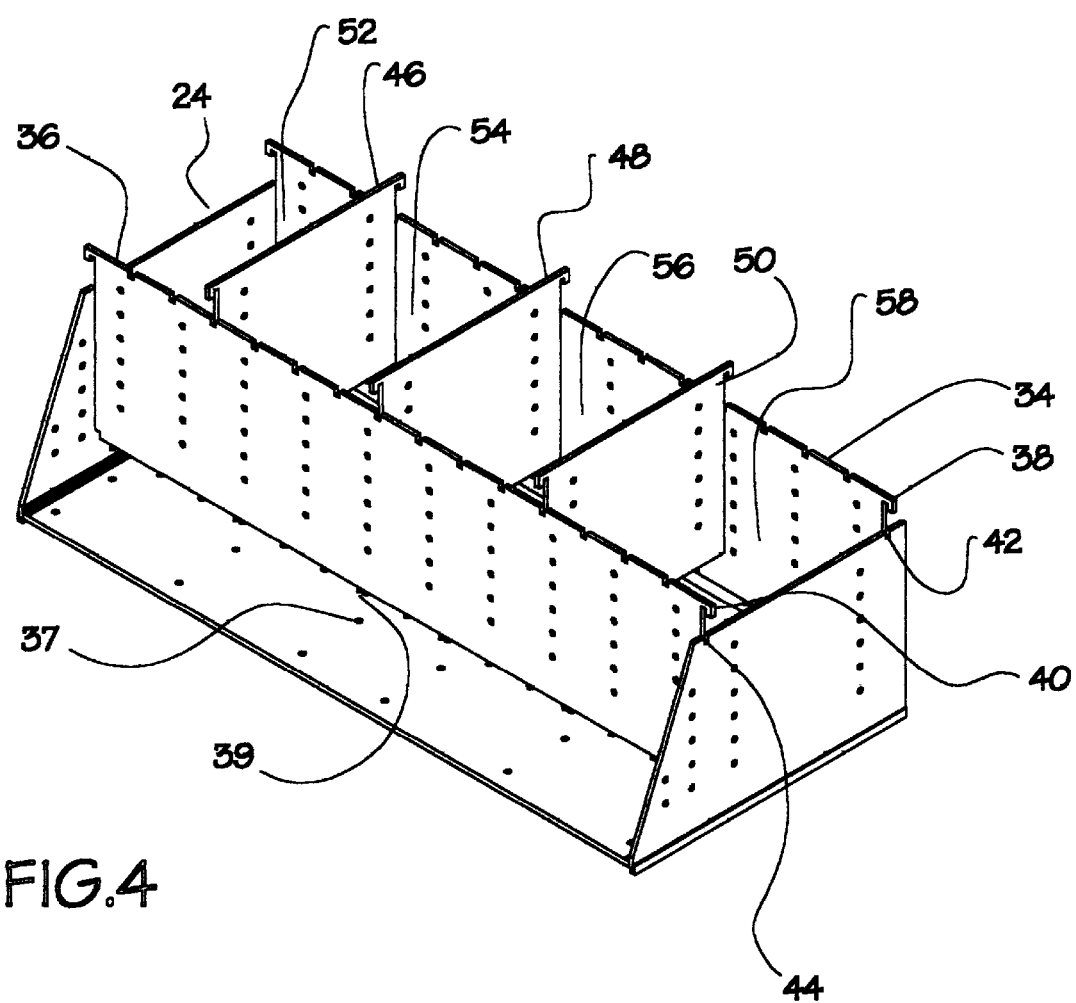
FIG. 4 is a drawing showing the assembled container including divider panels.
Figure 5:
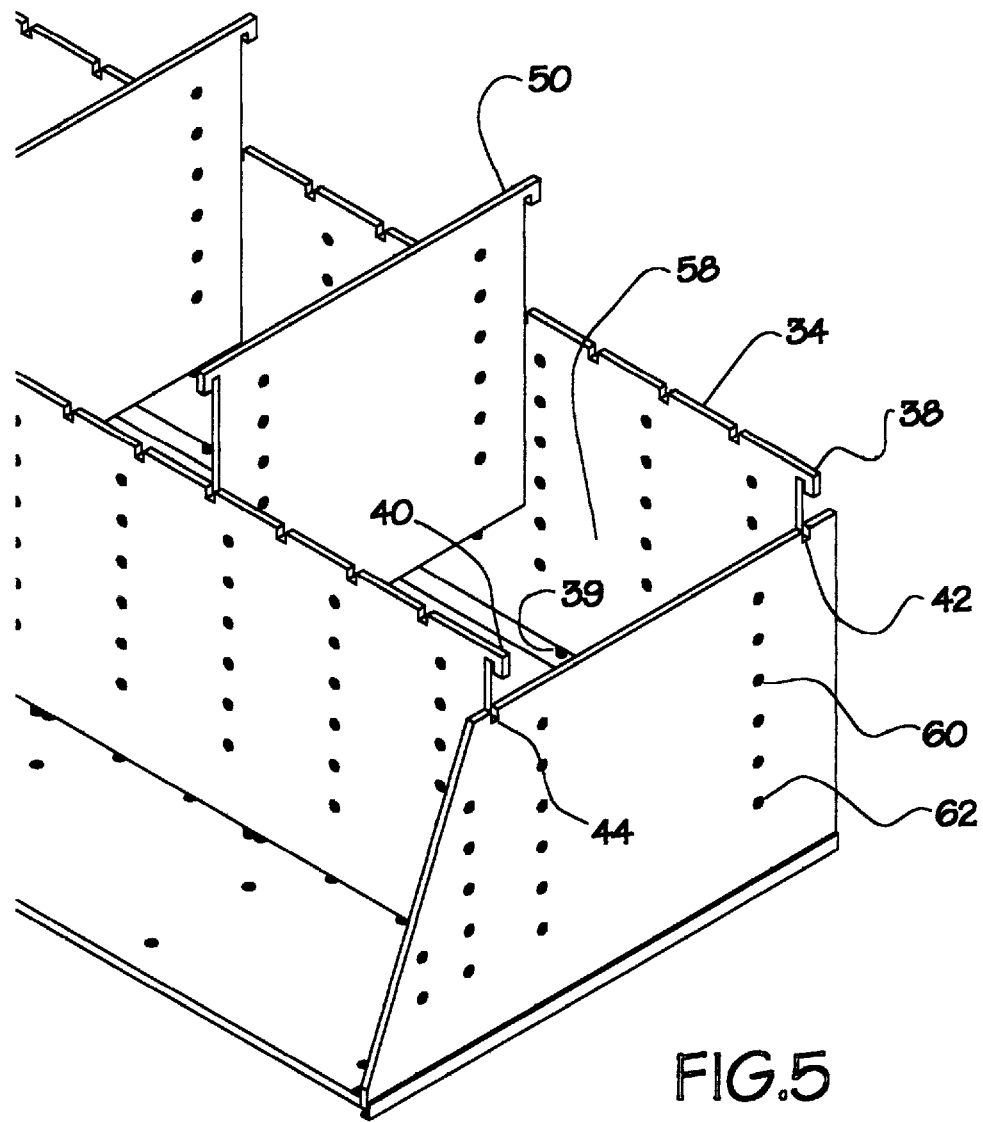
FIG. 5 is a drawing showing the locking tab details.

Referring to FIG. 4, a back panel 34 and a front panel 36 are vertically installed between the side panels 22,24. Tabs 38, 40 on the front panel 36 and rear panel 34, respectively, drop into slots, 42,44. This locks the back panel 34 and front panel 36 to the bottom panel 20, with further locking by tabs, e.g. 39 which fit into holes, e.g. 37, in the bottom panel 20. Similarly, the opposite edges of the front panel 36 and rear panel 34 are locked to the side panel 24. It is to be noted that no hardware is required to secure and lock the back panel 34 and front panel 36 to the side panels 22,24. Dividers, e.g. 46,48,50 may be installed using a similar locking technique to provide compartments 52,54,56,58 within the container 10. The locking technique utilizing tabs 38,40 and slots 42,44 are shown in greater detail in FIG. 5, as well as the locking of a divider, e.g. 50, to the back panel 34. No hardware is required in assembly of the container 10.

Figure 6:
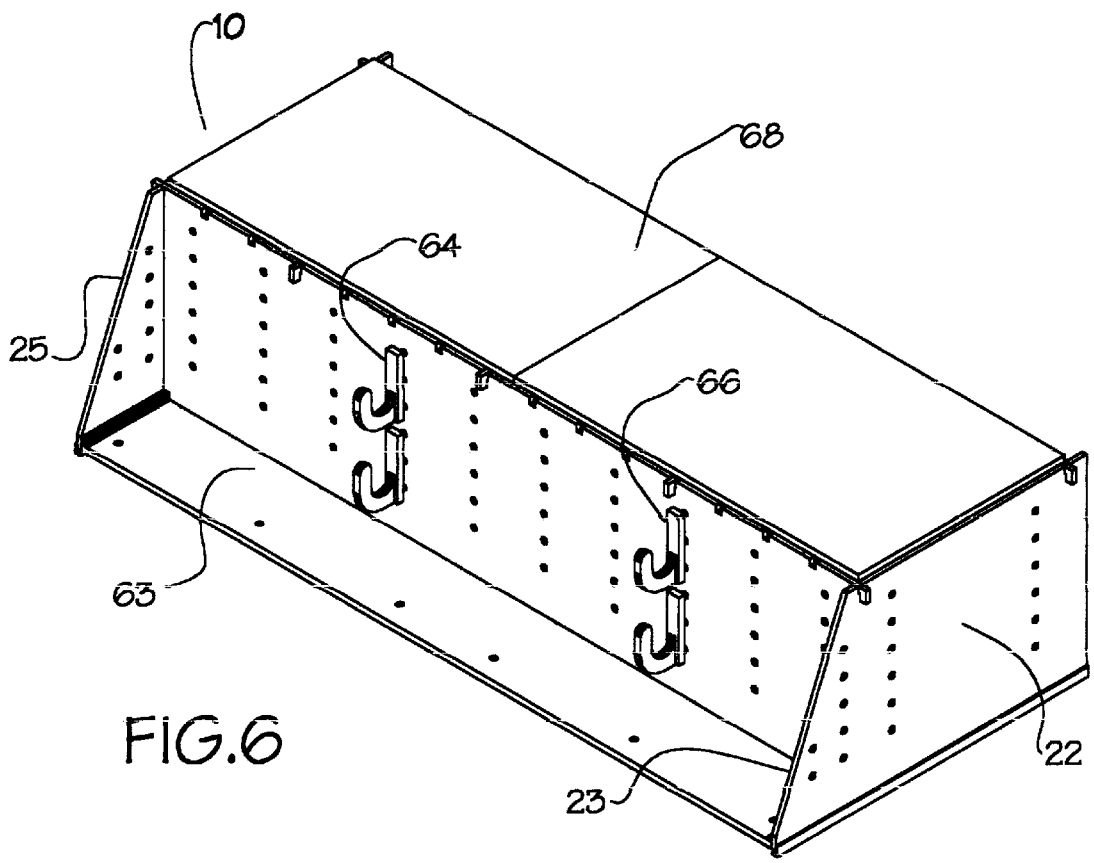
Fig. 6 is a drawing showing the use of hooks to provide hangers for suspending items from the panels of the container.

As the front panel 36 is vertically oriented, and the side panels 22,24 have sloping front edges, 23,25, a prismatically shaped volume 63 is formed at the front region of the container 10 by the front panel 36 and the triangularly shaped portions of the side panels 22,24 (FIG. 6). It will be noted that through holes, e.g. 60, 62 are provided on the panels that constitute the container 10 as well as in the dividers, e.g. 50. Hooks e.g. 64,66 may be mounted on the panels by means of the holes; for example, on the front panel 36, as shown in FIG. 6. The hooks, e.g. 64,66 may be positioned to carry a rifle, or fishing rod or other items, and it will be seen with the container 10 assembled behind the front seats 16,18 the contents of the volume 63 is shielded from sight by the raised backs of the seats 16,18 whose drafts substantially match the slopes of the edges 23,25. Access to the volume 63 is available by rotating the backs of the seats 16,18 forward.

As also seen in FIG. 6, a cover panel 68 may be fitted over the top of the container 10, further concealing the contents stored in the interior of the container 10, as well as providing a storage shelf behind the seats 16,18. It will be noted that the entire container may be readily disassembled and removed so that the jump seats may be raised for passenger use.

The container 10 is preferably constructed from panels of plastic, but may also be constructed from wood, or metallic materials.

The invention has been described in detail with particular reference to preferred embodiments thereof, but it will be understood that variations and modifications can be effected within the spirit and scope of the invention. For example, the disclosed invention may be mounted and secured in a variety of extended cab trucks, such as later Ford, Chevrolet and Dodge models, with minor modification to the attachment device described in this specification.

What is claimed is:

1. A container mountable in a cab of an extended cab truck, said cab comprising an enclosed portion of said extended cab truck, said cab including a driver's seat, a passenger's seat and a space behind said seats, said space further having lump seats mounted therein, said container comprising:
   a) a substantially rectangular bottom panel mountable in a horizontal orientation in said cab,
   b) a first side panel having a first rotatable connection to a first edge of said bottom panel whereby said first side panel may be folded inwardly over said bottom panel, and also may be vertically positioned while connected to said bottom panel, said first side panel further having at least first and second slots notched therein,
   c) a second side panel having a second rotatable connection to a second edge of said bottom panel whereby said second panel may be folded inwardly over said bottom panel and also may be vertically positioned while connected to said bottom panel, said second side panel further having at least third and fourth slots notched therein,
   d) means for securing said bottom panel and said first and second side panels to said cab,
   e) a removable back panel having first and second tabs, said first tab for insertion and self locking in said first slot of said first side panel, and said second tab for insertion and self locking in said third slot of said second panel, whereby said back panel is connected to said first side panel and said second side panel,
   f) a removable front panel having third and fourth tabs, said third tab for insertion and self locking into said second slot of said first side panel, and said fourth tab for insertion and self locking into said fourth slot of said second panel, whereby said front panel is connected to said first side panel and said second side panel, and
   g) a multiplicity of tabs along the bottom edges of said front panel and said back panel for mating with holes in said bottom panel to further lock said front panel and said back panel to said bottom panel, whereby an assembled container is formed by said bottom panel, said first side panel, said second side panel, said front panel and said back panel.

2. The container of claim 1 wherein said means for securing said bottom panel and said first and second side panels to said cab comprises a latch secured to said bottom panel for engagement with said cab.

3. The container of claim 2 wherein said cab further comprises the backplate of a folded down jump seat.

4. The container of claim 1 wherein said first and said second rotatable connections are hinges.

5. The container of claim 1 wherein said first and said second side panels have sloping front edges wherein each of said front edges make an acute interior angle with said bottom panel when said side panels are vertically positioned with respect to said bottom panel.

6. The container of claim 1 wherein said front panel and said back panel are vertically oriented relative to said bottom panel.

7. The container of claim 1 wherein at least one divider panel provides at least two compartments within said assembled container.

8. The container of claim 1 wherein said first side panel, said second side panel, said front panel and said back panel are provided with holes for accepting hooks capable of supporting stored items.

9. The container of claim 1 wherein said container's panels are fabricated from plastic, metal or wood.

10. The container of claim 1 wherein said assembled container is covered by a top panel.

11. The container of claim 1 wherein said assembled container has a volume aft of said driver or passenger seat, said volume being directly accessible by folding forward the back of the driver or passenger seat.

12. A method of assembling and installing a disassembled container behind front seats of an extended cab truck to provide an assembled container, said truck having a space behind said front seats with jump seats mounted in said space, wherein said assembled container cannot be removed from said truck in assembled form, said method comprising:
   a) placing a bottom panel having two side panels hinged to opposite edges of said bottom panel on top of a backplate of a folded down jump seat in said cab, said two side panels being inwardly folded over said bottom panel,
   b) securing said bottom panel to said backplate,
   c) raising said side panels to the vertical,
   d) installing a vertically oriented back panel relative to said bottom panel by fitting tabs on said back panel into slots provided in said side panels, and
   e) installing a vertically oriented front panel relative to said bottom panel by fitting tabs on said back panel into slots provided in said side panels, whereby said container is assembled and installed in said truck.

13. The method of claim 12 further including placing a top panel onto said container assembled and installed in said truck.

14. The method of claim 12 further including dividing said container into compartments by use of divider panels placed within said container assembled and installed in said truck.

* * * * *